United States Patent [19]

Sattar et al.

[11] Patent Number: 5,728,204
[45] Date of Patent: Mar. 17, 1998

[54] PREPARATION OF PHTHALOCYANINE-CONTAINING WATERBORNE COATING SYSTEMS

[75] Inventors: Abdul Sattar, Mt. Pleasant; Michael J. Greene, Charleston, both of S.C.; Herman Gerson, New York, N.Y.

[73] Assignee: Bayer Corporation, Pittsburgh, Pa.

[21] Appl. No.: 594,197

[22] Filed: Jan. 31, 1996

[51] Int. Cl.$^6$ .................................................. C09B 67/50
[52] U.S. Cl. .......................... 106/411; 106/410; 106/413; 106/31.49; 106/31.78
[58] Field of Search .................................. 106/410, 411, 106/413, 31.49, 31.78

[56] References Cited

U.S. PATENT DOCUMENTS

| | | | |
|---|---|---|---|
| 2,526,345 | 10/1950 | Giambalvo | 106/411 |
| 2,902,384 | 9/1959 | Meyer | 106/411 |
| 3,754,958 | 8/1973 | Giambalvo | 106/411 |
| 4,057,436 | 11/1977 | Davies et al. | 106/410 |
| 4,152,171 | 5/1979 | Barraclough et al. | 106/411 |
| 4,236,933 | 12/1980 | Torre | 106/413 |
| 4,239,549 | 12/1980 | Fabian et al. | 106/413 |
| 4,709,021 | 11/1987 | Donegan et al. | 540/141 |
| 4,726,847 | 2/1988 | Wanser | 106/411 |
| 5,324,354 | 6/1994 | Jesse et al. | 106/413 |
| 5,362,780 | 11/1994 | Bäbler et al. | 524/88 |
| 5,472,490 | 12/1995 | Sawamura et al. | 106/413 |
| 5,489,330 | 2/1996 | Wunderlich | 106/413 |

FOREIGN PATENT DOCUMENTS

| | | |
|---|---|---|
| 430875 | 6/1991 | European Pat. Off. . |
| 1502884 | 3/1978 | United Kingdom . |

OTHER PUBLICATIONS

T. Schauer and L. Dulog, "Einflussfaktoren bei der Bestimmung der Teilchengrosse von Pigmenten" in farbe +lacke, 97, 665–669 (month unavailable) 1991.

J.F. Santimauro, "An Introduction to Copper Phthalocyanine Pigments" in Dyestuffs, 43, 158–163 (month unavailable) 1960.

R. Craft, "Mechanisms of Pigment Dispersion Stabilization in Water–borne Coatings" in Modern Paint and Coatings, pp. 38–43 (Mar. 1991).

*Primary Examiner*—Mark L. Bell
*Assistant Examiner*—Scott L. Hertzog
*Attorney, Agent, or Firm*—Joseph C. Gil; Richard E.L. Henderson

[57] ABSTRACT

This invention relates to water-dispersible phthalocyanine pigment formulations that are mixtures of (a) about 60 to about 99.5% by weight, based on the total amount of components (a) and (b), of a conditioned metal phthalocyanine pigment, and (b) about 0.5 to about 40% by weight, based on the total amount of components (a) and (b), of a water-insoluble sulfonated phthalocyanine having the formula $$Pc(SO_2OR)_x \quad (I)$$

wherein

Pc represents a phthalocyanine moiety;

R is H or M, wherein M is a monovalent metal, divalent metal, trivalent metal, or ammonium cation, and x is a from about 0.2 to about 4.

11 Claims, No Drawings

PREPARATION OF PHTHALOCYANINE-CONTAINING WATERBORNE COATING SYSTEMS

BACKGROUND OF THE INVENTION

This invention relates to a water-based coating system containing phthalocyanine pigments and certain sulfonated copper phthalocyanines.

Solvent-based pigment systems in which various pigments are dispersed in an organic liquid are known. When preparing dispersions of phthalocyanine pigments, it is generally necessary to include various additives, particularly ionic surfactants, to maintain a stable dispersion. E.g., U.S. Pat. No. 4,057,436 and T. Schauer and L. Dulog, "Einflussfaktoren bei der Bestimmung der Teilchengrosse von Pigmenten" in *farbe+lacke*, 97, 665–669 (1991). Sulfonated copper phthalocyanines have been described as particularly useful dispersing agents for solvent-based phthalocyanine pigment dispersions used for coatings and inks (e.g., U.S. Pat. Nos. 2,526,345, 3,754,958, 4,152,171, 4,709,021, and 4,726,847 and British Patent 1,502,884; see also J. F. Santimauro, "An Introduction to Copper Phthalocyanine Pigments" in *Dyestuffs*, 43, 158–163 (1960)) and have even been described as useful for imparting heat stability to quinacridone pigments used in plastics (e.g., U.S. Pat. No. 5,362,780) but have not previously been described for use in waterborne pigment systems.

Waterborne pigment systems can provide both environmental and economic advantages over solvent-based pigment systems. However, as with solvent-based systems, it is generally necessary to include various additives to provide suitable dispersions of phthalocyanine pigments. E.g., R. Craft, "Mechanisms of Pigment Dispersion Stabilization in Water-borne Coatings" in *Modern Paint and Coatings*, pages 38–43 (March, 1991). For example, U.S. Pat. No. 4,239,549 discloses the use of certain alkylarylsulfonic acids to provide water-dispersible phthalocyanine pigment formulations, and European Patent Application 430,875 discloses the use of certain sulfonated pyrrolopyrrole and quinacridone derivatives to provide water-dispersible formulations containing pyrrolopyrrole pigments and quinacridone pigments, respectively. Although U.S. Pat. No. 3,754,958 discloses amine-containing pigment preparations that can also contain water, only solvent-based applications are disclosed. Stable aqueous dispersions containing mixtures of phthalocyanine and sulfonated copper phthalocyanines such as prepared according to the present invention have not previously been disclosed.

It has now been found possible to prepare stable water-dispersible phthalocyanine pigment formulations by surface treating conditioned phthalocyanine pigments with certain sulfonated copper phthalocyanines.

SUMMARY OF THE INVENTION

This invention relates to a water-dispersible phthalocyanine pigment formulation comprising a mixture of (a) about 60 to about 99.5% by weight (preferably 90 to 98% by weight), based on the total amount of components (a) and (b), of a conditioned metal phthalocyanine pigment (preferably a copper phthalocyanine pigment), preferably having a mean particle size of about 0.2 to about 0.3 μm, and (b) about 0.5 to about 40% by weight, based on the total amount of components (a) and (b), of a water-insoluble sulfonated phthalocyanine (preferably a sulfonated metal phthalocyanine, more preferably a sulfonated copper phthalocyanine) having the formula $$Pc(SO_2OR)_x \quad (I)$$

wherein

Pc represents a phthalocyanine moiety (preferably a metal phthalocyanine moiety, more preferably a copper phthalocyanine moiety);

R is H or M, wherein M is a monovalent metal, divalent metal, trivalent metal, or ammonium cation, and x is from about 0.2 to about 4 (preferably 1 to 1.8).

This invention further relates to an aqueous coating system comprising (1) about 10 to about 30 percent by weight (preferably 15 to 20 percent by weight) of a water-dispersible phthalocyanine pigment formulation of the invention, and (2) a water-dispersible coating binder.

DETAILED DESCRIPTION OF THE INVENTION

The present invention relates generally to water-based coating systems containing metal phthalocyanine pigments and certain sulfonated phthalocyanines. The preferred metal phthalocyanine pigments of component (a) are copper phthalocyanines. However, other metal-containing phthalocyanines, such as those based on cobalt, iron, nickel, and other such metals known in the art, can also be used. Furthermore, the metal phthalocyanine pigments of the present invention can be either partially ring-substituted (for example, with 1 to 16 chlorine, $C_1$–$C_6$ alkyl, $C_1$–$C_6$ alkoxy, or other substituents typical of phthalocyanine pigments) or can be unsubstituted.

The sulfonated phthalocyanines used as component (b) are preferably water-insoluble free sulfonic acids having the general formula $Pc(SO_2OH)_x$ in which Pc is phthalocyanine moiety (most preferably a metal phthalocyanine moiety) and x is from about 0.2 to about 4. However, water-insoluble salts having the general formula $Pc(SO_2OM)_x$ in which M is a cationic alkali metal, alkaline earth metal, zinc, aluminum, or $R^aR^bR^cR^dN^+$ (in which $R^a$, $R^b$, $R^c$, and $R^d$ are independently $C_1$–$C_{18}$ alkyl, phenyl, or phenyl substituted with $C_1$–$C_6$ alkyl, $C_1$–$C_6$ alkoxy, halogen, nitro, aryl, amino, amido, carboxyl, or other known substituents) are also suitable. It also possible, although much less preferred, to use sulfonamides having the general formula $Pc(SO_2NR^eR^f)_x$ (in which $R^e$ and $R^f$ can be $C_1$–$C_6$ alkyl, $C_1$–$C_6$ alkoxy, halogen, nitro, aryl, aminoalkyl, or other known substituents), optionally in admixture with compounds of formula (I). Although also generally not preferred, primarily for economic reasons, the phthalocyanine moiety can be ring-substituted, for example, with chlorine, alkyl, alkoxy, or other known substituents. It is also possible to use sulfonated phthalocyanines of formula (i) in which the phthalocyanine moiety Pc is metal free.

Component (b) is preferably a sulfonated copper phthalocyanine. Particularly preferred sulfonated copper phthalocyanines include the so-called monosulfonated copper phthalocyanines having the formula $Pc(SO_2OR)_x$ in which Pc represents a copper phthalocyanine moiety (including ring-substituted derivatives); R is H or, generally less preferably, M in which M is a monovalent, divalent, or trivalent metal cation or an ammonium ion as described above; and x is from about 1 to about 1.8. Although such compounds must, of course, be insoluble in water, even alkali metal and alkaline earth salts can be used as long as they exhibit the requisite insolubility. Disulfonated copper phthalocyanines, on the other hand, are generally unsuitable, at least in part because of their generally greater water solubility. A particularly preferred sulfonated copper phthalocyanine represented by the formula $Pc(SO_2OH)_x$ in which x is about 1.7 is commercially available from Fabricolor, Paterson, N.J.

Crude phthalocyanine pigments are usually prepared by a reaction of phthalic anhydride or a derivative thereof, urea, and a metal source, or by a reaction of phthalonitrile or a derivative thereof and a metal source in an organic solvent. The resultant phthalocyanine particles, however, undergo crystal growth during preparation and have a major axis of about 10 to about 200 μm. Such metal phthalocyanines have little or no color value as a pigment for use in inks, coating compositions, plastics, and the like. For this reason, crude metal phthalocyanine must be conditioned by methods known in the art, such as milling and/or solvent treatment methods, to obtain a high color value. Conditioned pigments typically have pigmentary particle sizes of about 0.01 to about 0.5 μm and suitable crystal forms. Phthalocyanine pigments (a)(i) according to the present invention, however, should preferably have mean particle sizes of about 0.2 to about 0.3 μm.

Phthalocyanine pigments (a) are preferably conditioned before the sulfonated phthalocyanine component (b) is added, but it is also possible to mix the two components before the conditioning step. For example, pigment component (a) can be mixed using known methods with at least a portion of the specified amount of component (b) before being conditioned. Suitable mixing methods include dry-milling or, if a wet-milling or solvent conditioning process is to be used, simple solvent treatment, optionally at elevated temperatures. Regardless of whether the components are mixed before or after the conditioning process, it is possible to use essentially any method normally used for conditioning phthalocyanines.

Suitable milling methods for conditioning phthalocyanine pigments include dry-milling methods, such as sand-milling, ball-milling, and the like, with or without additives, or wet-milling operations such as salt-kneading, bead-milling, and the like in water or organic solvents (such as alcohols or esters), with or without additives. After the milling step is completed, an optional solvent treatment can also be used, generally at temperatures between about 10° C. and about 200° C. This solvent treatment is preferably carried out at elevated temperatures, such as 60° C. to 145° C. Suitable solvents for the optional solvent treatment include water; inorganic acids, such as sulfuric or phosphoric acid, adjusted to suitable strength; organic acids, such as formic or acetic acid; and various organic solvents such as alcohols (for example, methanol, ethanol, or ethylene glycol), cyclic or open-chain ethers (for example, dioxane, tetrahydrofuran, ethylene glycol monoalkyl or dialkyl ethers, and oligo- and polyglycol ethers); ketones (for example, acetone or methyl ethyl ketone), aromatics (for example, toluene, xylene, chlorobenzene, nitrobenzene, or chloronaphthalene), esters (for example, methyl benzoate, dimethyl phthalate, dimethyl succinate, or methyl salicylate), and amides (for example, formamide, dimethylformamide, or N-methylpyrrolidone). It is often advantageous to use mixtures of these solvents.

Suitable solvents for direct solvent conditioning include inorganic acids such as sulfuric or phosphoric acid. The strength and quantity of the acid can be adjusted so that the pigment is dissolved. When using concentrated acids such as sulfuric acid, about 6 to 10 times by weight of acid relative to the quantity of pigment is typically used. The acid-treated pigment is precipitated from the acidic liquid solution by adding water ("acid pasting") or, in an optional method, the acidity is adjusted in such a way that acid salts form, so that transformation to a solution occurs in suspension ("acid swelling"). Other suitable, but generally less preferred, solvents for such solvent treatment include organic acids, such as formic or acetic acid; alcohols, such as methanol, ethanol, or ethylene glycol; ethers such as dioxane, tetrahydrofuran, ethylene glycol monoethyl or diethyl ether, or oligo- and polyglycol ethers; ketones, such as acetone or methyl ethyl ketone; aromatics, such as toluene, xylene, chlorobenzene, nitrobenzene, or chloronaphthalene; esters, such as methyl benzoate, dimethyl phthalate, or methyl salicylate; and amides, such as formamide, dimethylformamide, or N-methylpyrrolidone.

Pigments used in the process of the invention can be after-treated using known methods. Such after-treatment can be carried out under conditions similar to those described above for the optional solvent treatment used after milling. The tinctorial strength and transparency of the pigment can be affected by varying the after-treatment.

In a preferred milling procedure, a copper phthalocyanine pigment is introduced into a ball mill and milled wet or dry and the milled pigment is then treated with methyl benzoate in a dilute water slurry, typically at 30° to 145° C. Use of methyl salicylate or dimethyl phthalate instead of methyl benzoate is also suitable. If desired, the ester solvent can then be hydrolyzed with dilute caustic. The resultant product is then collected, washed, and dried by methods known in the art.

In another preferred milling procedure, a copper phthalocyanine pigment is added to water to make a slurry that is then passed through a bead mill containing, for example, glass or zirconium silicate beads spinning at high speed. The pigment slurry is separated from the beads and heated, typically at 30° to 145° C., before isolation.

In a preferred solvent conditioning procedure, a copper phthalocyanine is added to an excess (e.g., 10 parts by weight relative to the mixed pigments) of concentrated sulfuric acid and stirred, preferably at room temperature, until solution is complete. The solution can be precipitated by pouring the acidic liquid solution slowly into cold water with agitation. The resultant precipitate is filtered and preferably washed until free of acid. When using the acid precipitation method, it is generally preferred to carry out an after-treatment of the resultant presscake, for example, by preparing a slurry in water and heating, typically at 30° to 145° C., before isolation.

In another preferred solvent conditioning procedure, a copper phthalocyanine is added to 65 to 80% sulfuric acid, during which process the pigment is swelled. The swelled pigment can be precipitated by pouring into cold water with agitation. The resultant precipitate can be then be after-treated and isolated as described above.

Regardless of the conditioning method used, the conditioned metal phthalocyanine pigment should preferably have a mean particle size of about 0.2 to about 0.3 μm.

If the sulfonated copper phthalocyanine component is not added before conditioning (or if only a portion of the sulfonated copper phthalocyanine component is added), the conditioned phthalocyanine pigment is intimately mixed with the sulfonated metal phthalocyanine component (b) using known methods, preferably dry-milling, to obtain the specified relative amounts.

Aqueous coating systems according to the invention can be prepared by blending water-dispersible phthalocyanine pigment formulations of the invention with suitable water-dispersible coating binders known in the art. Although the specific type of binder is generally not critical as long as it is dispersible in water, preferred binders include known water-dispersible homopolymers or copolymers of olefinically unsaturated monomers (especially (meth)acrylic binders, either as free acids or corresponding alkyl or hydroxyalkyl esters), polyester binders, polyurethane binders, and combinations thereof. Suitable coating systems contain about 10 to about 30 percent by weight (preferably 15 to 20 percent by weight) of the pigment formulation, the remainder being the binder, known fillers and other additives, and water. The water-based coating systems according to the present invention are suitable for use in many coating applications where pigmented coatings are desired.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Examples 1–7

Examples 1–7 illustrate the preparation of copper phthalocyanine pigments in the presence and absence of sulfonated copper phthalocyanine additive.

Coloristic properties were determined using a waterborne base coat/solvent-borne clear coat system. Aqueous dispersions were prepared using a mixture of 12.4% AROLON® 559-G4-70 acrylic resin (Reichhold Chemicals, Inc.), 3.2% SOLSPERSE 27000 hyperdispersant (Zeneca, Inc.), 1.6% 2-amino-2-methyl-1-propanol (Angus Chemical), and 18% pigment, which gave a pigment-to-binder ratio of 18:12 and a total solids content of 30%. The pigment-to-binder ratio was then reduced to 10:40 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 µm and 38 µm wet film thickness, respectively, and allowed to stand at room temperature for fifteen minutes and at 100° C. for five minutes. Clear coats containing a mixture of 80% of AROPLAZ® 1453-X-50 alkyd resin (Reichhold Chemicals, Inc.) and 20% CYMEL® 325 melamine/formaldehyde resin at a total solids level of 57% were then applied over the base coat at a 76 µm wet film thickness allowed to stand at room temperature for fifteen minutes and at 121° C. for fifteen minutes.

Undertone tint paints were prepared from the reduced aqueous dispersions described above having a pigment-to-binder ratio of 10:40 by adding additional AROLON® 559-G4-70 acrylic resin, CYMEL® 325 melamine/formaldehyde resin, and 35% TINT-AYD® CW-5003 white dispersion (Daniel Products Company), which gave a pigment-to-binder ratio of 1:1.1, a total solids content of 55%, and a $TiO_2$-to-pigment ratio of 90:10. Color measurements were made using films applied at 38 µm wet film thickness and allowed to stand at room temperature for fifteen minutes and at 100° C. for five minutes. Clear coats were then applied and baked as described above.

Metallic paints were prepared from the dispersion described above having a pigment-to-binder ratio of 18:12 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, aluminum-to-pigment ratios of 20:80 and 80:20, and a total solids content of 43%. Color measurements were made using films applied at 38 µm wet film thickness and baked as described above. Clear coats were then applied and baked as described above.

Reflectance color strength in the CIELAB measuring system were determined for each test sample using an ACS-1800 color computer (for tints) and an X-Rite MA58 Multi-Angle Spectrophotometer (metallics). In the CIELAB system, the term H refers to hue; the term C refers to chroma, an indication of the color saturation and is calculated as the square root of the sum of the squares of $a^*$ and $b^*$; the term L refers to lightness, for which a higher value is a lighter color and a lower value is a darker color; and the term E refers to total color difference. Results are reported in terms of the difference (i.e., delta values) between the corresponding H, C, L, and E values of clearcoats prepared using pigments containing the sulfonated copper phthalocyanine additive and corresponding values of the comparison pigments prepared in the absence of sulfonated copper phthalocyanine additive.

Example 1

100 Parts of a copper phthalocyanine having a chlorine content of 16% by weight ("tetrachloro copper phthalocyanine") obtained from Sanyo Color Works, Ltd. (Japan), and a small amount of a hydroxy-containing solvent were introduced into a ball mill containing 3000 parts of steel balls as grinding elements. The capacity of the ball mill was such that it was about 60% full when completely charged. The mill was rotated for 48 hours. The powder was discharged from the mill through a screen that retained the grinding elements. The ball-milled powder was added to water (4 times of the weight of the pigment) and stirred until thoroughly wet. The wetted powder was treated with methyl benzoate (80% by weight of the pigment powder), then heated to 85°–90° C. and kept at that temperature for 12 hours. After the batch was cooled, the methyl benzoate was hydrolyzed using 50% aqueous sodium hydroxide at 90° C. for about 4 hours. The resultant mixture was cooled, filtered, washed with water, and dried to give a conditioned pigment exhibiting a blue hue.

A sulfonated copper phthalocyanine having a sulfonation ratio of about 1.71, available in presscake form from Fabricolor (Paterson, N.J.), was dried at about 80° C. until moisture was constant (two to four days). A 5 g portion of the dried sulfonated copper phthalocyanine was dry mixed with 100 g of each conditioned pigment and mechanically blended. The resultant mixtures were discharged from the blender as water-dispersible pigments that were used to prepare water-based paints exhibiting a blue hue. Metallic paints prepared according to the invention exhibited deep travel and neutral flop.

Comparison water-based paints prepared in the same manner but in the absence of the sulfonated copper phthalocyanine exhibited a blue hue but exhibited a lower strength, lighter masstone, slightly less transparency, and, for the metallic paints, inferior travel and flop.

Coloristic properties are summarized in the Table.

TABLE

Color properties of the aqueous dispersions of Example 1
(relative to comparison pigments containing no sulfonated copper phthalocyanine)

|  | Strength (%) (at 610 nm) | ΔH | ΔC | ΔL | ΔE | Comments |
|---|---|---|---|---|---|---|
| Nonmetallic[a] | 120 | −0.03 | 0.38 | 0.05 | 0.38 | Trace brighter |
| Metallic 1[b] | | | | | | |
| 25° angle | — | −1.25 | 1.48 | 5.24 | 5.59 | Green, bright, light |
| 45° angle | — | 0.26 | −0.74 | 1.02 | 1.29 | Trace red, slightly dull, light |
| 75° angle | — | 1.78 | −1.06 | −1.16 | 2.37 | Red, dull, dark |
| Travel[d] | | 3.03 | | −6.40 | | Darker |
| Metallic 2[c] | | | | | | |
| 25° angle | — | 0.00 | 1.42 | 2.24 | 2.65 | Bright, light |
| 45° angle | — | 0.02 | 0.55 | 0.01 | 0.55 | Slightly bright |
| 75° angle | — | 0.42 | −0.75 | −1.96 | 2.14 | Trace red, slightly dull, dark |
| Travel[d] | | 0.42 | | −4.20 | | Darker |

[a]Nonmetallic paint contains no aluminum.
[b]Metallic paint 1 contains aluminum and pigment in a 20:80 weight ratio.
[c]Metallic paint 2 contains aluminum and pigment in an 80:20 weight ratio.
[d]Travel values are calculated using the formulas $\Delta H_{75°} - \Delta H_{25°}$ and $\Delta L_{75°} - \Delta L_{25°}$.

Example 2

The process of Example 1 was repeated, except that a copper phthalocyanine having a chlorine content of 5.7% by weight ("monochloro copper phthalocyanine") obtained from Sanyo Color Works, Ltd. (Japan) was used instead of tetrachloro copper phthalocyanine. The conditioned pigment, which exhibited a reddish blue hue, yielded water-based metallic and nonmetallic paints exhibiting a reddish blue hue when applied to a substrate and dried.

A comparison water-based paint prepared in the same manner but in the absence of the sulfonated copper phthalocyanine provided a painted surface having a reddish blue hue but a lower strength, lighter masstone, less transparency, and, for the metallic paints, inferior travel and flop.

Example 3

100 Parts of crude Pigment Green 7 having a chlorine content of 48% by weight was conditioned as in Example 1. The conditioned pigment, which exhibited a greenish hue, yielded water-based metallic and nonmetallic paints exhibiting a greenish hue when applied to a substrate and dried.

A comparison water-based paint prepared in the same manner but in the absence of the sulfonated copper phthalocyanine provided a painted surface having a greenish hue but a lower strength, lighter masstone, less transparency, and, for the metallic paints, inferior travel and flop.

Example 4

50 Parts of crude Pigment Green 7 having a chlorine content of 48% by weight and 50 parts of a tetrachloro copper phthalocyanine having a chlorine content of 16% by weight were mixed and the mixture conditioned as in Example 1. The conditioned pigment, which exhibited a greenish-blue hue, yielded water-based metallic and nonmetallic paints exhibiting a greenish-blue hue when applied to a substrate and dried.

A comparison water-based paint prepared in the same manner but in the absence of the sulfonated copper phthalocyanine provided a painted surface having a greenish-blue hue but a lower strength, lighter masstone, less transparency, and, for the metallic paints, inferior travel and flop.

Example 5

A crude unchlorinated copper phthalocyanine (125 g) obtained from Toyo Ink Inc. (Japan) as "Phthalo Blue Crude CPC No. 4 Grade" was introduced into a ball mill containing 3000 g of steel balls as grinding elements. The capacity of the ball mill was such that it was about 60% full when completely charged. The mill was rotated for 48 hours, after which the resultant powder was discharged through a screen that retained the grinding elements. The ball-milled powder was added to water (four times the weight of the pigment) and stirred until thoroughly dispersed. The wetted powder was then treated with dimethyl succinate (60% by weight of the pigment powder), then heated to 85° C. and kept at that temperature for eight hours. The treated pigment was cooled and the dimethyl succinate was hydrolyzed using 50% aqueous sodium hydroxide at 85° C. for two hours. The resultant mixture was cooled, filtered, washed with water, and dried to give a conditioned pigment having a greenish-blue hue. The conditioned pigment, after being blended with the sulfonated copper phthalocyanine and dispersed in aqueous medium, yielded water-based metallic and nonmetallic paints exhibiting a greenish-blue hue when applied to a substrate and dried.

A comparison water-based paint prepared in the same manner but in the absence of the sulfonated copper phthalocyanine provided a painted surface having a greenish-blue hue but a lower strength, lighter masstone, less transparency, and, for the metallic paints, inferior travel and flop.

Example 6

The process of Example 5 was repeated, except that the chlorine-free phthalocyanine was replaced with a mixture of 30% by weight monochlorinated copper phthalocyanine (obtained from Sanyo Color Works) and 70% by weight chlorine-free copper phthalocyanine (obtained from Toyo Ink Inc.). The conditioned pigment, which exhibited a reddish blue hue, yielded water-based metallic and nonmetallic paints exhibiting a reddish blue hue when applied to a substrate and dried.

A comparison water-based paint prepared in the same manner but in the absence of the sulfonated copper phthalocyanine provided a painted surface having a reddish blue hue but a lower strength, lighter masstone, less transparency, and, for the metallic paints, inferior travel and flop.

Example 7

The process of Example 6 was repeated, except that the chlorine-free phthalocyanine was replaced with a crude cobalt phthalocyanine (obtained from Bayer AG, Germany). The conditioned cobalt phthalocyanine pigment, which exhibited a strong, soft turquoise hue, yielded water-based metallic and nonmetallic paints exhibiting a turquoise hue when applied to a substrate and dried.

A comparison water-based paint prepared in the same manner but in the absence of the sulfonated copper phthalocyanine provided a painted surface having a turquoise hue but a lower strength, lighter masstone, less transparency, and, for the metallic paints, inferior travel and flop.

What is claimed is:

1. A water-dispersible phthalocyanine pigment formulation consisting essentially of a mixture of
   (a) 60 to 99.5% by weight, based on the total amount of components (a) and (b), of a conditioned metal phthalocyanine pigment, and
   (b) 0.5 to 40% by weight, based on the total amount of components (a) and (b), of a water-insoluble sulfonated phthalocyanine having the formula

   $Pc(SO_3R)_x$ wherein
   Pc represents a phthalocyanine moiety;
   R is H or M, wherein M is a monovalent metal, divalent metal, trivalent metal, or ammonium cation, and
   x is from about 0.2 to about 4,
   wherein the metal phthalocyanine pigment (a) is conditioned before being mixed with the water-insoluble sulfonated phthalocyanine (b).

2. A water-dispersible phthalocyanine pigment formulation according to claim 1 wherein metal phthalocyanine pigment (a) is a copper phthalocyanine pigment or a ring-substituted derivative thereof.

3. A water-dispersible phthalocyanine pigment formulation according to claim 1 wherein sulfonated phthalocyanine (b) is from sulfonated metal phthalocyanine.

4. A water-dispersible phthalocyanine pigment formulation according to claim 1 wherein sulfonated phthalocyanine (b) is a sulfonated copper phthalocyanine.

5. A water-dispersible phthalocyanine pigment formulation according to claim 1 wherein sulfonated phthalocyanine (b) is a sulfonated copper phthalocyanine having the formula

   $Pc(SO_3R)_x$ wherein
   Pc is a copper phthalocyanine moiety;
   R is H or M, wherein M is a monovalent, divalent, or trivalent metal cation or an ammonium ion; and
   x is from about 1 to about 1.8.

6. A water-dispersible phthalocyanine pigment formulation according to claim 1 wherein sulfonated phthalocyanine (b) is a sulfonated copper phthalocyanine having the formula

   $Pc(SO_3H)_x$ wherein
   Pc is a copper phthalocyanine moiety; and
   x is from about 1 to about 1.8.

7. A water-dispersible phthalocyanine pigment formulation according to claim 1 wherein sulfonated phthalocyanine (b) is a sulfonated copper phthalocyanine having the formula

   $Pc(SO_3M)_x$ wherein
   Pc is a copper phthalocyanine moiety;
   M is a cationic alkali metal, alkaline earth metal, zinc, aluminum, or $R^a R^b R^c R^d N^+$, wherein $R^a$, $R^b$, $R^c$, and $R^d$ are independently $C_1-C_{18}$ alkyl, phenyl, or substituted phenyl; and
   x is from about 1 to about 1.8.

8. An aqueous coating system comprising
   (1) about 10 to about 30 percent by weight of a water-dispersible phthalocyanine pigment formulation consisting essentially of a mixture of
      (a) 60 to 99.5% by weight, based on the total amount of components (a) and (b), of a conditioned metal phthalocyanine pigment, and
      (b) 0.5 to 40% by weight, based on the total amount of components (a) and (b), of a water-insoluble sulfonated phthalocyanine having the formula

      $Pc(SO_3R)_x$ wherein
      Pc represents a phthalocyanine moiety;
      R is H or M, wherein M is a monovalent metal, divalent metal, trivalent metal, or ammonium cation, and
      x is from about 0.2 to about 4; and
   (2) a water-dispersible coating binder.

9. An aqueous coating system comprising
   (1) about 10 to about 30 percent by weight of a water-dispersible phthalocyanine pigment formulation consisting essentially of a mixture of
      (a) 60 to 99.5% by weight, based on the total amount of components (a) and (b), of s conditioned metal phthalocyanine pigment, and
      (b) 0.5 to 40% by weight, based on the total amount of components (a) and (b), of a water-insoluble sulfonated phthalocyanine having the formula

      $Pc(SO_3R)_x$ wherein
      Pc represents a phthalocyanine moiety;
      R is H or M, wherein M is a monovalent metal, divalent metal, trivalent metal, or ammonium cation, and
      x is from about 0.2 to about 4,
      wherein the metal phthalocyanine pigment (a) is conditioned before being mixed with the water-insoluble sulfonated phthalocyanine (b); and
   (2) a water-dispersible coating binder.

10. An aqueous coating system according to claim 8 wherein the water-dispersible coating binder is a homopolymer or copolymer of olefinically unsaturated monomers, a polyester binder, a polyurethane binder, or a combination thereof.

11. An aqueous coating system according to claim 8 wherein the water-dispersible coating binder is an acrylic binder.

* * * * *